（12） United States Patent
Rudolph et al.

(10) Patent No.: US 9,372,834 B2
(45) Date of Patent: Jun. 21, 2016

(54) ALIGNING A SYMBOL WITH A CHARACTER

(71) Applicant: Apple Inc., Cupertino, CA (US)

(72) Inventors: Christopher E. Rudolph, Vancouver, WA (US); Eric T. Stucki, Brush Prairie, WA (US)

(73) Assignee: APPLE INC., Cupertino, CA (US)

( * ) Notice: Subject to any disclaimer, the term of this patent is extended or adjusted under 35 U.S.C. 154(b) by 669 days.

(21) Appl. No.: 13/657,814

(22) Filed: Oct. 22, 2012

(65) Prior Publication Data

US 2014/0115452 A1 Apr. 24, 2014

(51) Int. Cl.
G06F 17/00 (2006.01)
G06F 17/21 (2006.01)
G06K 9/34 (2006.01)
G06K 9/68 (2006.01)
G06F 17/22 (2006.01)
G06F 17/24 (2006.01)

(52) U.S. Cl.
CPC .............. *G06F 17/214* (2013.01); *G06K 9/344* (2013.01); *G06K 9/6828* (2013.01); *G06F 17/2217* (2013.01); *G06F 17/24* (2013.01); *G06K 2209/01* (2013.01)

(58) Field of Classification Search
CPC ............................ G06F 17/2217; G06F 17/24
See application file for complete search history.

(56) References Cited

U.S. PATENT DOCUMENTS

| 5,251,292 | A | * | 10/1993 | Martel et al. ................. 715/236 |
| 5,325,447 | A | * | 6/1994 | Vogt, III ................... G06K 9/42 |
| | | | | 345/472 |
| 5,803,629 | A | * | 9/1998 | Neville et al. ................. 400/304 |
| 2002/0093502 | A1 | * | 7/2002 | Koyama ........................ 345/467 |
| 2008/0030502 | A1 | * | 2/2008 | Chapman ................... 345/472.3 |

OTHER PUBLICATIONS

Rosenfeld et al., The Function of Documents, Proceedings of the Fourth International Conference on Document Analysis and Recognition, 1997, vol. 2, p. 1079.*
Author Unknown, "Amazon Kindle Publishing Guidelines," Dec. 13, 2011, 79 pages, Version 1.8, http://www.kulturklik.euskadi.net/amazon-kindle-publishing-guidelines-como-hacer-que-los-libros-esten-disponibles-para-la-plataforma-kindle/.

* cited by examiner

Primary Examiner — Andrew McIntosh
(74) Attorney, Agent, or Firm — Adeli LLP

(57) ABSTRACT

Some embodiments provide a novel operation for aligning a symbol with an associated character in a digital content processing application. In some embodiments, the alignment operation uses a font property of the character to align the symbol with the character. In some embodiments, the character has a slanted display orientation and the font property is an angle at which the character is slanted. Symbols that are associated with characters include diacritical marks, accents, mathematical symbols that align above or below a character, and other symbols of the character. The character, sometimes referred to as a "base character", may be a character in text, in an equation, etc.

20 Claims, 12 Drawing Sheets

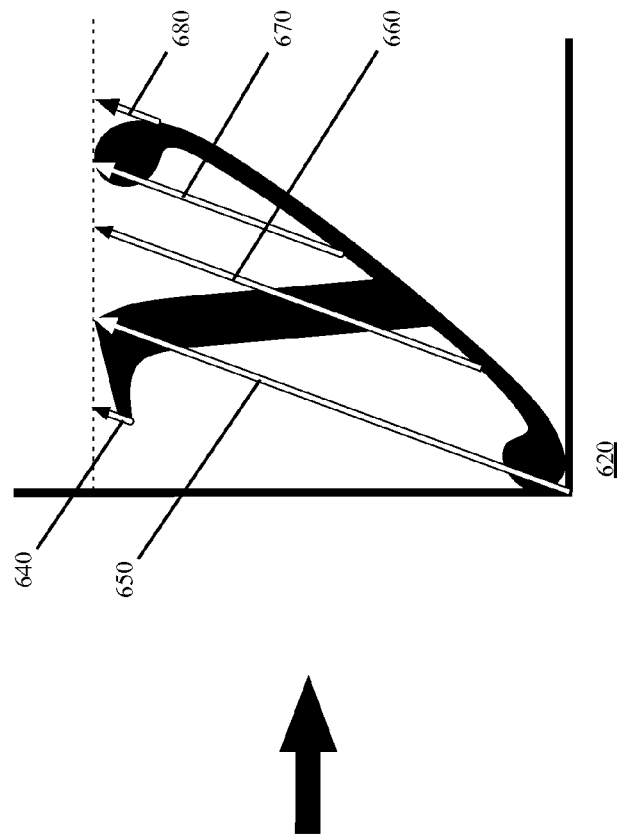
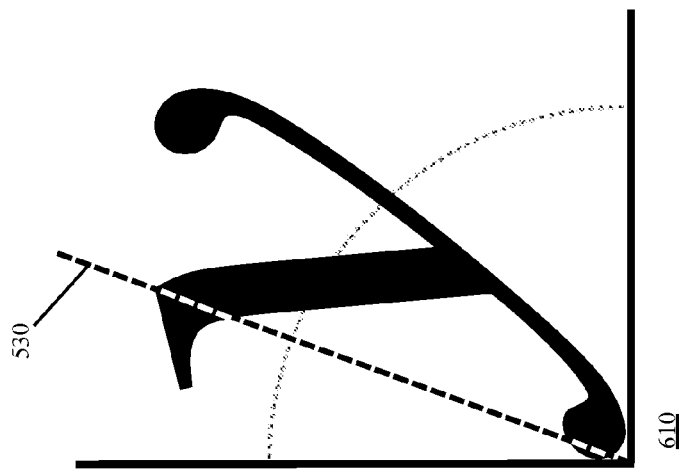
*Figure 6*

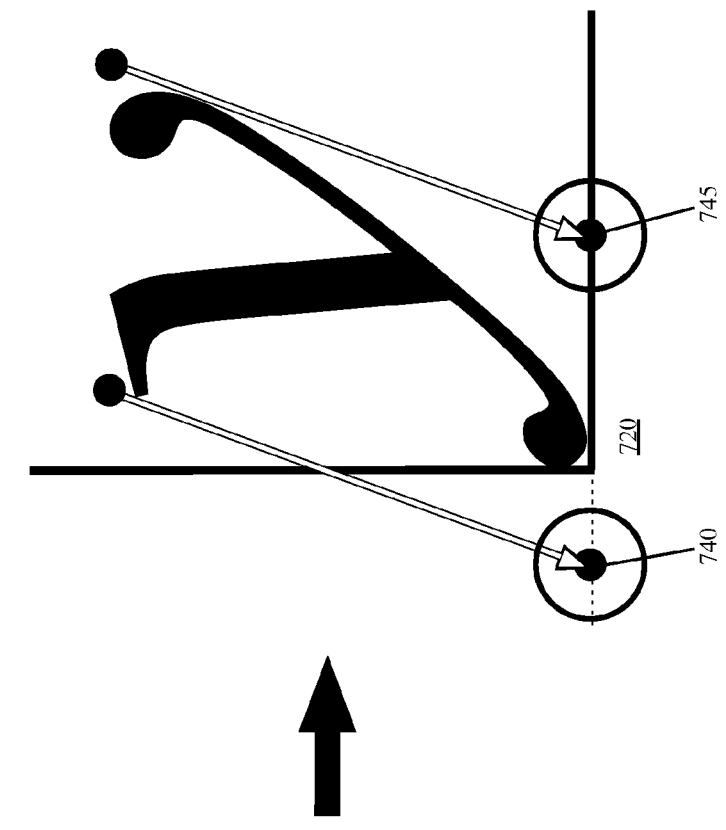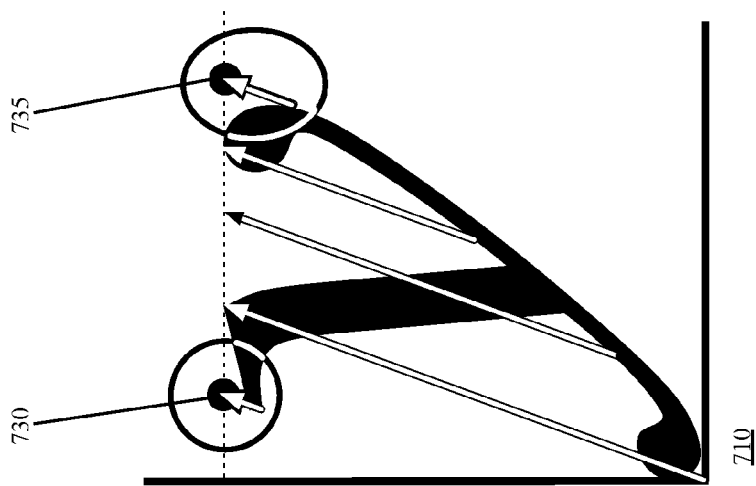
Figure 7

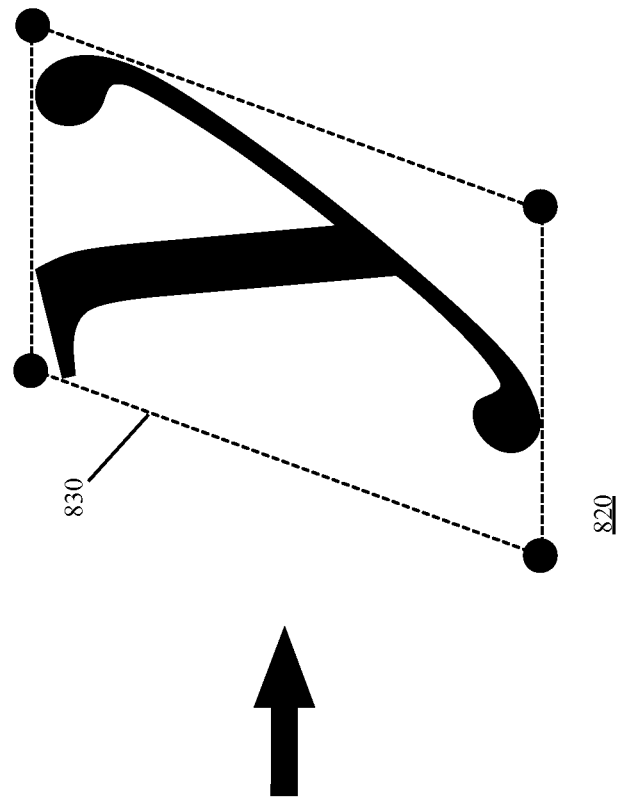
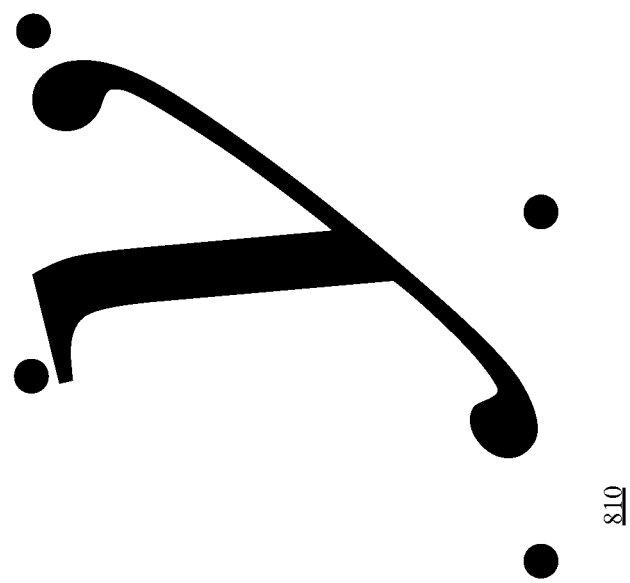
*Figure 8*

ALIGNING A SYMBOL WITH A CHARACTER

BACKGROUND

Digital document authoring, editing, and publishing applications (hereafter collectively referred to as content processing or digital content processing applications) provide authors, editors, publication designers, and other users with the necessary tools to create and edit structured electronic documents. Examples of such content processing applications include iBooks Author®, Pages®, and Keynote®, all licensed by Apple Inc. Content processing applications give users the ability to produce documents that include a variety of media content items such as text, image, video, and audio content items. A wide range of graphical text elements are provided by these content processing applications, including characters, accents, diacritical marks, and other symbols. Furthermore, such content processing applications allow users to display these graphical text elements in a variety of typeface designs and font styles. For example, a content processing application may provide the characters and diacritical marks of an alphabet in both serif and sans serif typefaces and in both regular and italic font styles.

Many content processing applications, however, appear to misalign symbols associated with a character when the character is displayed in a font style having an angle (e.g., italics, oblique). For example, an overbar centered above an italicized character having a long descending stem or tail (e.g., 'y') may appear conspicuously out of alignment with the slanted appearance of the character. FIG. 1 illustrates a prior art example of a symbol 110 that is misaligned above a character 105. As shown, the symbol 110 is displayed too far to the left with respect to the character 105. The symbol 110 is misaligned with the character 105 because the alignment centers the symbol 110 based on the full width of the character 105, which is from the left-most point of the character to the right-most point of the character.

BRIEF SUMMARY

Some embodiments provide a novel operation for aligning a symbol with an associated character in a digital content processing application (e.g., a word processing application, an authoring/publishing application, a mathematics processing application, etc.). In some embodiments, the alignment operation uses a font property of the character to align the symbol with the character. Examples of symbols that are associated with characters include diacritical marks, accents, and mathematical symbols that align above or below a character (e.g., the bar indicating a negation of a variable). The character, sometimes referred to as a "base character", may be a character in text or a character in an equation, etc.

In some embodiments, the content processing application aligns the associated symbol with the base character based on the slant of the character. Such slanted characters may include characters with italicized fonts, characters with oblique slants applied, etc. The content processing application of some embodiments determines the slant (e.g., from a defined property of the character) and then generates an alignment shape for the base character using the determined slant. The application then uses this alignment shape to align the symbol with its associated base character.

Specifically, some embodiments generate a parallelogram about the base character using the slant of the base character. In some embodiments, the interior angle of the parallelogram is offset from a right angle by the amount of slant of the base character. To generate the parallelogram, the application projects lines from various points of the base character at the angle of the character slant in order to identify the top corners of the parallelogram. Once the top corners of the parallelogram are identified, the application projects lines from these corner points down at the slant angle to the bottom of the base character to define the parallelogram. The associated symbol can then be aligned (e.g., above or below) the base character using this alignment shape. For instance, many symbols will be aligned using the midpoint of the top (or bottom) edge of the parallelogram, in order to provide a better alignment than simply using the top (or bottom) of a rectangle drawn around the entire character.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 6 illustrates an example of vectors projected to the top of a character based on the angle of the character's italic slant.

FIG. 7 illustrates an example of alignment points identified by vector projections to the top and bottom of the character.

FIG. 8 illustrates an example of an alignment shape defined by connecting a set of alignment points.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel operation for aligning a symbol with an associated character in a digital content processing application (e.g., a word processing application, an authoring/publishing application, a mathematics processing application, etc.). In some embodiments, the alignment operation uses a font property of the character to align the symbol with the character. Examples of symbols that are associated with characters may include diacritical marks, accents, mathematical symbols that align above or below a character (e.g., the bar indicating a negation of a variable). The character, sometimes referred to as a "base character", may be a character in text or a character in an equation.

Figure 1:
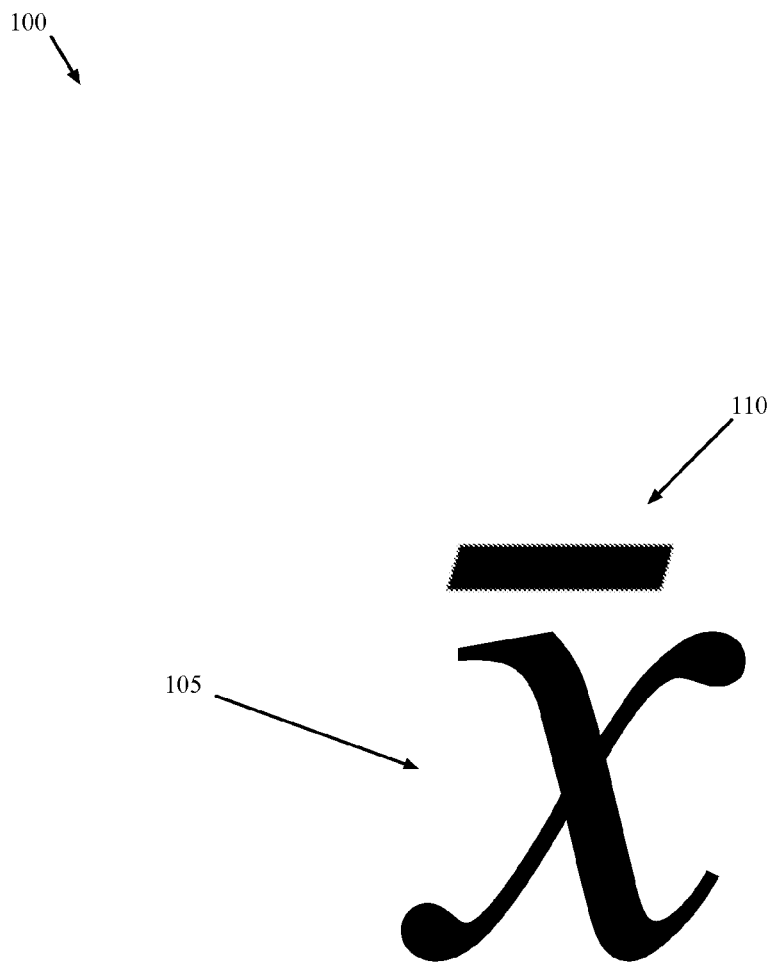
FIG. 1 illustrates a prior art example of a symbol that is misaligned above a character.
Figure 2:
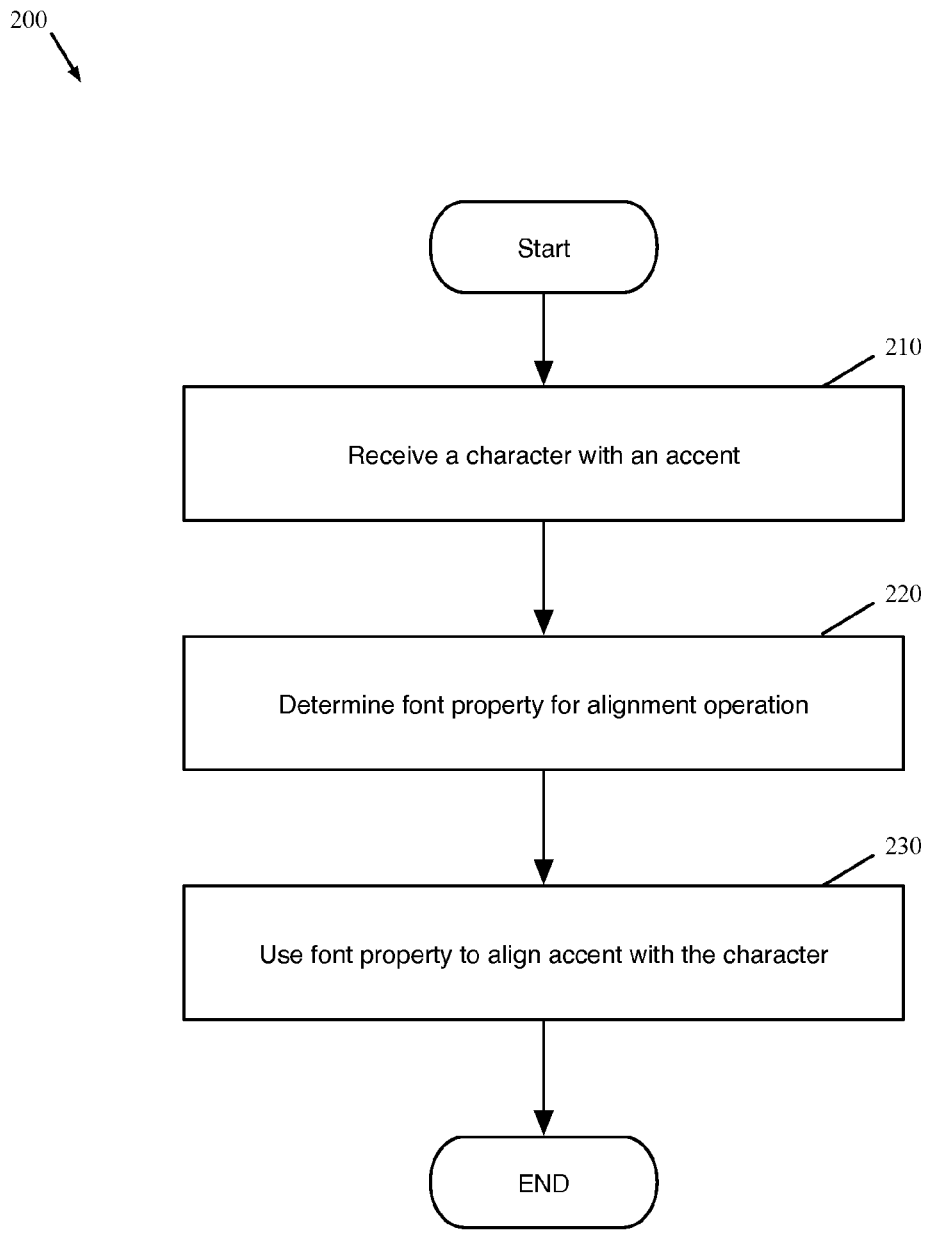
FIG. 2 conceptually illustrates a process of some embodiments for using a font property of a character to align a symbol with the character.

FIG. 2 conceptually illustrates a process of some embodiments for using a font property of a character to align a symbol with the character. The process 200 of some embodiments is performed by a content processing application. In some embodiments, the symbol is aligned with the character contemporaneously with a user inputting the character for display in a document processed by the application. For instance, in a word processor or equation editor of a content processing application, the symbol may be aligned with the character as the user enters the character into the document (e.g., on-the-fly alignment). On the other hand, some embodiments align the symbol with the character after several characters have been entered by the user and the application is processing all of the characters to generate a formatted publication of the document (e.g., when generating a formatted electronic book or when formatting a document generated in a markup language). In this case, each of the several characters is processed for symbol alignment. For example, the application processes each of the several characters in sequence (i.e., order of input). The process 200 is described by reference to FIG. 3, which illustrates an italicized character with a properly aligned associated symbol.

Figure 3:
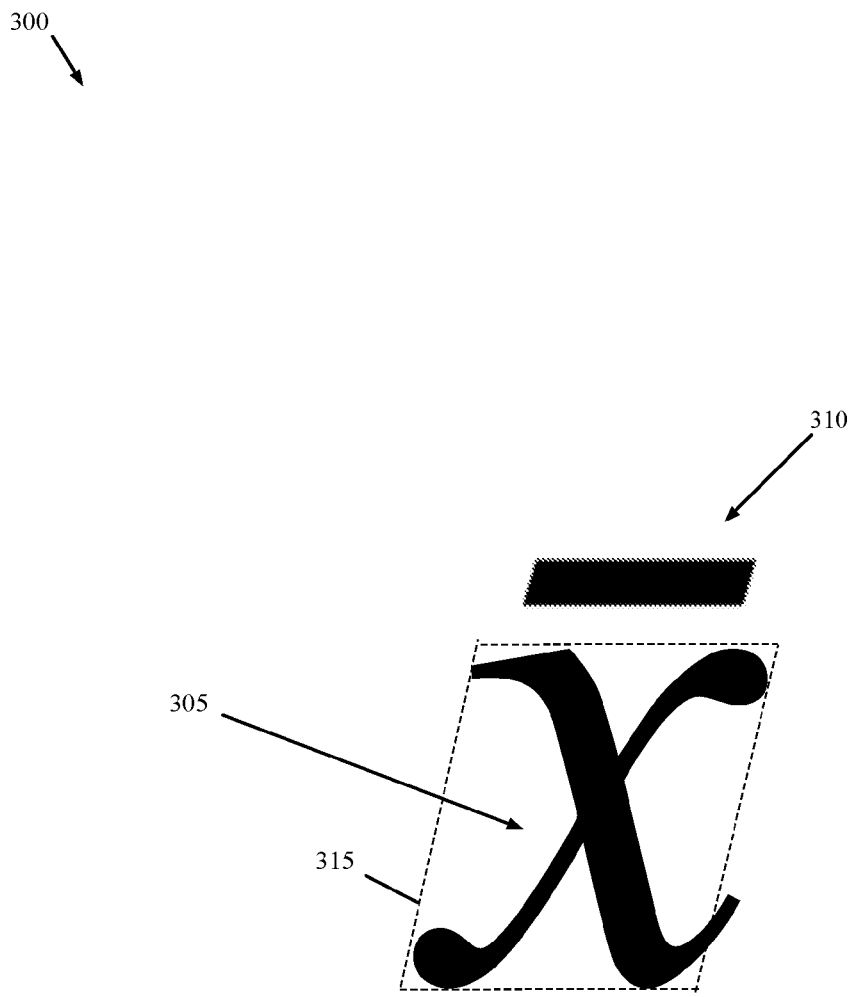
FIG. 3 illustrates an italicized character and a properly aligned associated symbol.

The process 200 of some embodiments begins by receiving (at 210) a character with an associated symbol. As stated, this symbol may be an accent or other diacritical mark, a mathematical symbol, or other symbol that aligns to the character. Examples of such symbols include a macron, tilde, acute accent, grave accent, etc. In addition, the symbol may have a specific location definition relative to the character (e.g., above and centered). FIG. 3 illustrates an italicized character 305 (i.e., 'x') and an associated symbol 310 (i.e., a macron). In this case, the macron 310 is located above the character 305 and centered with the character.

Next, the process 200 determines (at 220) a font property of the character for performing an alignment operation. In some embodiments, the font property is associated with a font style for displaying the italicized character. For instance, the font property may specify a slanted display orientation of the character. The slanted display orientation may, for example, specify an italic slant for a character displayed in an italicized font or indicate a degree of angular offset from a vertical axis of a coordinate system for a character displayed in an oblique font.

As shown in FIG. 3, the italicized character 305 appears at an angle or slant. In some embodiments, the angle is a property stored with the font or set by a user to apply to the character. The angle (e.g., for an italicized font) may be stored in the operating system on which the content processing application operates or within the content processing application itself.

After determining the font property for the alignment operation, the process 200 uses (at 230) the font property to align the symbol with the associated character. For example, the process may use the italic or oblique slant applied to the character to offset the symbol in order to provide a more accurate and pleasing visual appearance. The process ends after aligning the symbol with the character.

In order to align the symbol with the associated character, some embodiments generate a parallelogram about the base character using the slant of the base character. In some embodiments, the interior angle of the parallelogram is offset from a right angle by the amount of slant of the base character. To generate the parallelogram, the application projects lines from various points of the base character at the angle of the character slant in order to identify the top corners of the parallelogram. Once the top corners of the parallelogram are identified, the application projects lines from these corner points down at the slant angle to the bottom of the base character to define the parallelogram. The associated symbol can then be aligned (e.g., above or below) the base character using this alignment shape. For instance, many symbols will be aligned using the midpoint of the top (or bottom) edge of the parallelogram, in order to provide a better alignment than simply using the top (or bottom) of a rectangle drawn around the entire character.

FIG. 3 illustrates such a parallelogram 315 generated for the character 305. This shape is based on the slant value of the character 305 (i.e., the slant of the parallelogram is equal to the slant of the character). In addition, because of the particular process used by some embodiments to generate this shape, the parallelogram does not completely encompass the entire base character. In some embodiments, a line projected from the rightmost point on the character (i.e., the top right of the character 305) defines the right edge of the parallelogram, which results in the bottom right portion of the character 305 being outside the parallelogram.

Because the macron 310 is designated for display centered and above the character, the content processing application of some embodiments uses the midpoint of the alignment shape 315 to center the macron 310. This results in a macron placed in the most visually appealing location for the character.

In some situations, however, the alignment process does not result in an ideal location for the symbol relative to the character (e.g., because the character has serifs or other flourishes that result in a non-ideal alignment shape). For such characters, some embodiments store a predefined setting (e.g., an override setting) indicating a specific location for symbols associated with the character. As an alternative, some embodiments may remove such serifs or flourishes from the character before generating the alignment shape.

Several more detailed embodiments are described below. Section I describes an implementation of an authoring application for aligning accents with characters. Section II describes the software architecture of a content processing application that uses an equation editor in some embodiments. Lastly, Section III describes a computer system that implements some embodiments of the invention.

I. Aligning Symbols with Associated Characters

Aligning symbols with associated characters in a manner that appears visually pleasing depends on many factors. For instance, a character with which a symbol is to be aligned may be displayed in a variety of slanted orientations (e.g., italic slant, oblique slant, etc.). Thus, it may be desirable to align a symbol to an associated character based on the slanted orientation of the character.

Figure 4:
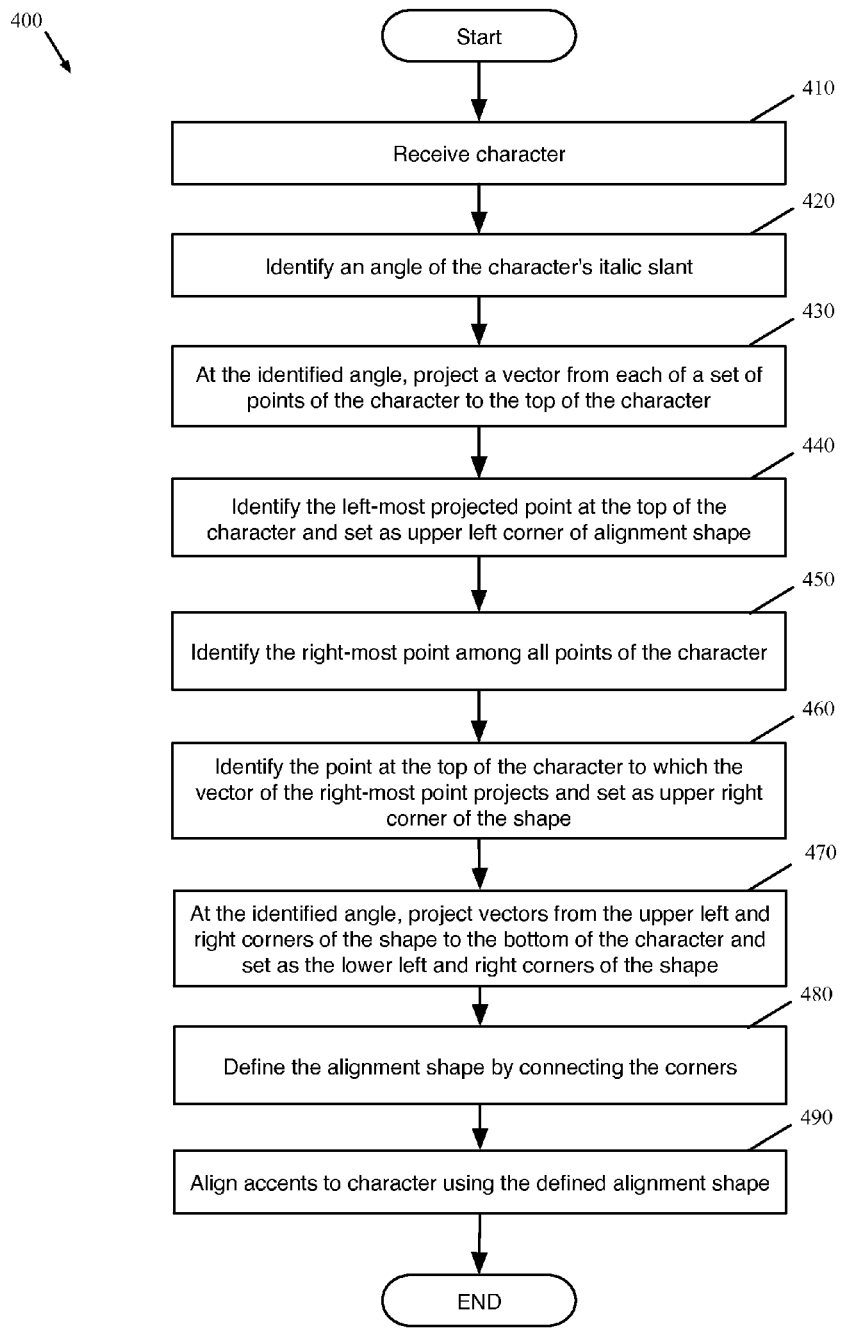
FIG. 4 conceptually illustrates a process of some embodiments for aligning symbols with associated italicized characters by defining alignment shapes around the characters.

Some embodiments of the invention align a symbol with an associated slanted (e.g., italicized or obliquely slanted) character by using an alignment shape. FIG. 4 conceptually illustrates a process 400 of some embodiments for aligning symbols with associated slanted characters by defining alignment shapes around the characters. The process 400 of some embodiments is performed by a content processing application. The process 400 is described by reference to FIGS. 5-9, which illustrate different stages of the process 400 for aligning a symbol with an associated italicized character using an alignment shape.

The process 400 of some embodiments begins by receiving (at 410) a character. The received character has an italic slant in some embodiments. The italic slant is defined differently in different embodiments. For example, the italic slant may be based on a font style (e.g., true italics, oblique style, etc.) or a user setting for displaying the character. In addition to the italic slant, the character also has one or more associated symbols (e.g., accents, diacritical marks, etc.). The symbols can be above, below, or both above and below the associated character. For example, the received character may have a macron (i.e., an overbar accent) that is displayed at a certain position above or below the character. In some embodiments, the position of each symbol is defined according to a specific location definition relative to the character (e.g., above and centered, below and on the right by a particular percentage).

Figure 5:
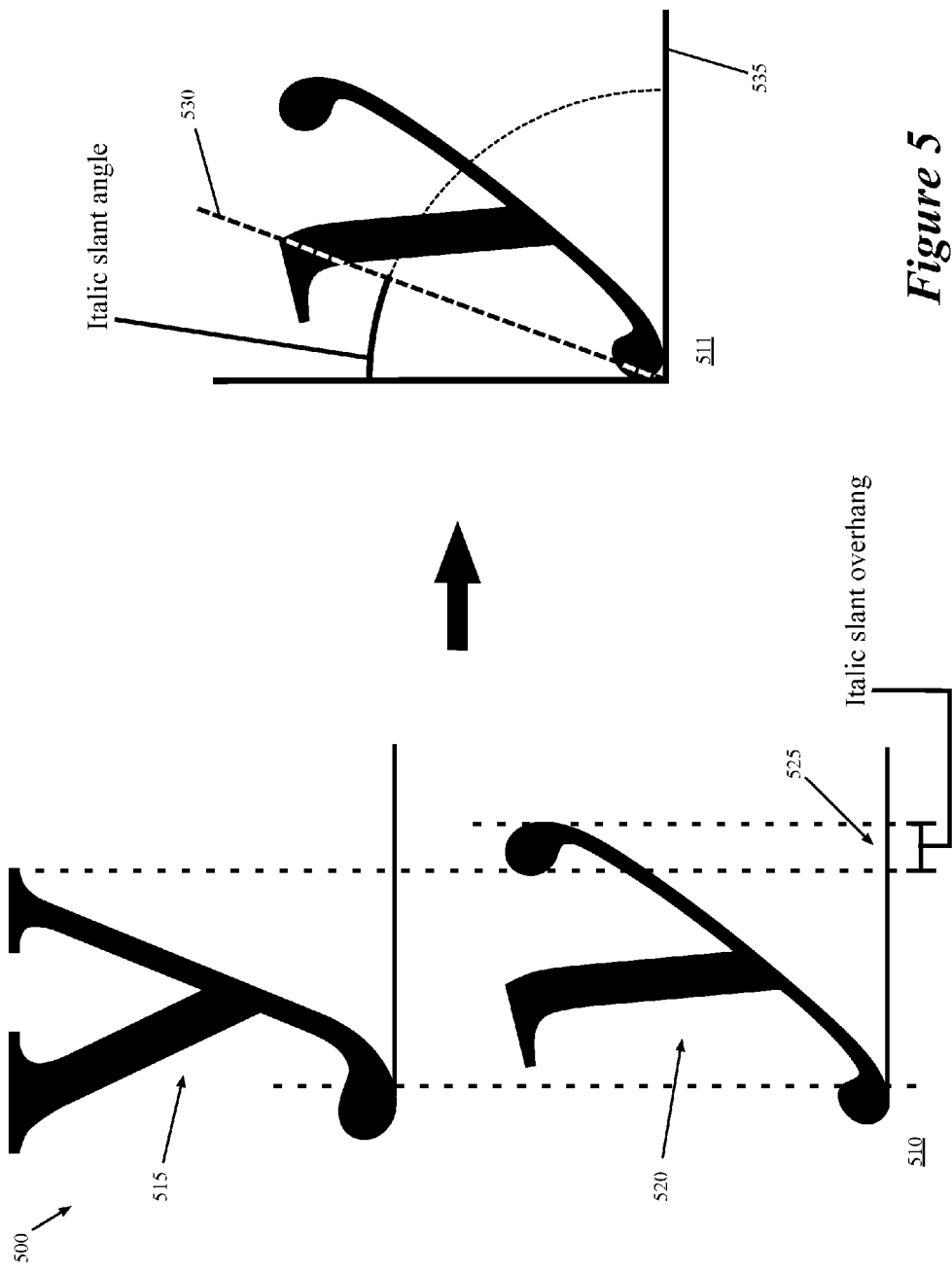
FIG. 5 illustrates an example of an angle associated with an italic slant of a character.

FIG. 5 illustrates, in two stages 510 and 511, an example of an angle associated with an italic slant of a character in some embodiments. The character is displayed within a content processing application in some embodiments. For example, the character may be displayed in a word processing application, an equation editor of a word processing application, or a document creation and publication application. In this case, the different stages of FIGS. 5-9 represent the processing stages performed by the application before actually displaying the character. For example, the application may perform these processing stages upon receiving an input to display an italicized character that has an associated symbol (e.g., "Ü"), and then, after the processing is completed, the application may display the processed character and symbol. In other embodiments, the character is one of several characters (e.g., "Boğaziçi Üniversitesi . . . ") displayed within the application and these stages represent the processing performed to format each character of the several characters for publication. For example, the application may format each of several characters only after all of the characters in a document are displayed and the application receives an input to publish the document (e.g., by converting a document to PDF or to an electronic book format).

In the first stage 510, the received character is illustrated in a normal font 515 (i.e., 'y') that has an upright display orientation and an italicized font 520 (i.e., 'y') that has a slanted display orientation. The character 520 with the italicized font style is wider than the character 515 with the normal font style, as shown by the italic slant overhang 525. This overhang is a result of applying the italic slant of the italicized font to the character. The received character 520 also has an associated symbol for display with the character (e.g., to modify a property of the character, such as a value, a pronunciation, etc.). The symbol, in some embodiments, is for display either above or below the associated character. In some embodiments, the content processing application determines a display position of the symbol based on a specific location definition that is associated with displaying the symbol relative to the character (e.g., above and centered). In the example illustrated in FIG. 5 (and subsequent figures), however, the symbol associated with the received character is omitted from the drawings in order not obscure the example with unnecessary detail.

After receiving the character, the process 400 identifies (at 420) an angle of the character's italic slant. In some embodiments, the italic slant is based on an angle stored with the font style (e.g., true italics, oblique, etc.) or set by a user to apply to the character. In some embodiments, the angle is a property stored in the operating system on which the content processing application operates or within the content processing application itself. For instance, when a user applies the "italics" property to a character, the content processing application of some embodiments automatically applies a particular slant to the character or substitutes a different character (i.e., a different predefined glyph) with a particular slant.

In the second stage 511 of FIG. 5, the italic slant angle 530 is shown for the italicized character 'y' 520. A coordinate system 535 for the character is shown in the second stage 511 to illustrate the angular offset that defines the italic slant (i.e., the angle offset from the vertical axis). While the font property indicates the angle of the character's italic slant in some embodiments, other embodiments determine the italic slant from the angular offset of the character in the coordinate system 535.

Next, the process 400 projects (at 430), at the identified angle, a vector from each of a set of points of the italicized character 520 to the top of the character. FIG. 6 illustrates, in two stages 610 and 620, an example in some embodiments of vectors that the content processing application projects to the top of a character based on the angle of the character's italic slant. In the first stage 610, the dashed italic slant line 530 indicates the slant angle of the italicized character 'y' 520. The content processing application uses the slant angle of the character to compute the vector projections. In the second stage 620, the content processing application projects the vectors 640-680 from different points of the character to locations along the top of the character (i.e., along the dashed line that represents the top of the character).

The content processing application of some embodiments projects these vectors from points that are based on a path of the character. For instance, in some embodiments a character is a glyph defined by a path that connects a set of points and curves between the points. The set of points from which vectors are projected, in some embodiments, is the set of points in the character path, while in other embodiments, the content processing application projects the vectors from a subset of the set of points in the path of the character. As shown in FIG. 6, several vectors are projected from several points of the character. This subset of points includes, in some embodiments, the point of the character that has the left-most projected vector at the given slant angle, and the right-most point of the character. In addition, the subset can include any number of other points of the character. The vector that is projected from each of the subset of points, in some embodiments, is defined by the identified angle 630 of the character's italic slant.

In some embodiments, the application projects the vectors to the top of the character. To identify the top of the character, some embodiments determine a vertical position of the highest point of the character (e.g., based on a coordinate system associated with the character, or using a value specified in a font property (e.g., size) of the character). For example, in some embodiments an italicized character may have a size property that specifies the height of the italicized character from a baseline of the character to the top of the character. Different embodiments measure size (e.g., height) in different units (e.g., pixels, specialized typeface units (e.g., "em" units), points, etc.). In some embodiments, the top of the character is stored in a font property (e.g., cap height, ascender height, etc.) and the content processing application retrieves the height property to compute the vector projections.

After projecting the vectors, the process 400 identifies (at 440) the left-most projected point at the top of the character and sets the identified left-most projected point as the upper left corner of an alignment shape. In some embodiments, the left-most projected point is associated with a point in the path of the italicized character that is not necessarily the left-most point in the character's path. Due to the angle of the italic slant, in some embodiments a vector projected from the left-most point in the path of the character does not identify the left-most projected point at the top of the character. Instead, another point in the path of the character projects to the left-most point at the top of the character.

As shown in the second stage 620, the point at the top of the italicized character to which the vector 640 is projected is the left-most projected point of the character. In FIG. 6, the italicized character 'y' has a long descending tail stroke containing several points that are farther to the left than the rest of the points of the character. However, the vector projections from these points, including the point from which the vector 650 is projected, all end at points that are farther to the right than other points at the top of the character. Thus, in this case the angle of the italic slant of the character determines the left-most projected point, which in this example is the point from which vector 640 is projected—not the point from which vector 650 is projected.

Next, the process 400 identifies (at 450) the right-most point among the points of the italicized character. In some embodiments, the content processing application identifies the right-most point among all the points in the path of the italicized character. In other embodiments the application identifies the right-most point among a subset of all the points in the path of the italicized character.

Once the right-most point is identified, the process 400 then identifies (at 460) a point at the top of the italicized character to which the vector of the right-most point is projected and sets this point as the upper right corner of the shape. Although the process 400 describes setting the upper left and right corners of the alignment shape at 440 and 460, in some embodiments, the process 400 sets the upper left and right corners of the shape after both the left-most projected point and the right-most point of the character are determined.

FIG. 7 illustrates, in two stages 710 and 720, an example of the corners of the shape being established from alignment points that the content processing application identifies by the vector projections. The first stage 710 shows the alignment point 730 being set as the upper left corner and the alignment point 735 being set as the upper right corner. Specifically, the content processing application identifies the upper left corner at the encircled alignment point 730 at the end of the vector projection 640, and the upper right corner at the encircled alignment point 735 at the end of the vector projection 680.

After establishing the points for the upper left and right corners of the alignment shape, the process 400 projects (at 470) vectors, at the identified slant angle, from these identified points to the bottom of the character and then sets these points as the lower left and right corners of the alignment shape. These points, in some embodiments, form a parallelogram that the content processing application uses to align a symbol with the character.

In the second stage 720 of FIG. 7, two vectors are projected down to the bottom of the character at the identified angle from the alignment points 730 and 735. The content processing application of some embodiments projects the vectors down to alignment points at the bottom of the italicized character in order to establish the lower right corner and lower left corner of the shape. As shown in the second stage 720, the two vector projections terminate at the encircled alignment points 740 and 745 at the bottom of the italicized character. Specifically, the content processing application establishes the lower left corner of the shape at the alignment point 740 and the lower right corner of the shape at the alignment point 745.

After establishing the upper and lower corners from the identified alignment points, the process 400 then defines (at 480) the alignment shape by connecting the alignment points at the corners. In some embodiments, the process connects all of the established corners so that a shape encompasses the character. However, as the right edge of the shape is determined based on the right-most point of the character (which may not have the rightmost projected vector at the slant angle), in some embodiments the shape substantially surrounds the character but does not entirely encompass the shape.

FIG. 8 illustrates, in two stages 810 and 820, an example of forming the alignment shape by connecting the upper left and right alignment point corners 730 and 735 and the lower left and right alignment point corners 740 and 745. The first stage 810 shows that the alignment points 730-745 have already been established as corners of the shape. The second stage 820 shows that the content processing application forms the alignment shape 830 by connecting the alignment points 730-745. As shown at this stage 820, the alignment shape 830 that is formed is a parallelogram that entirely surrounds the italicized character 520. While a parallelogram is formed in the example shown in FIG. 8, different shapes are formed in different embodiments. In some embodiments, a different shape is formed as a result of a different italic slant identified for the character or a different process for generating an alignment shape. For example, a reverse slanted font applied to a character may define the shape by identifying the right-most projected point as the upper right alignment point and the projection from the leftmost point as the upper left alignment point, resulting in a parallelogram slanting in the opposite direction from the shape 830.

After forming the alignment shape 830 by connecting the identified alignment points 730-745, the process 400 then uses the alignment shape 830 to align (at 490) one or more symbols (e.g., accent marks, diacritical marks, and/or mathematical notation symbols) with the italicized character 520. In some embodiments, the italicized character is associated with a single symbol that is positioned either above or below the character. The process 400 aligns the single symbol with the italicized character 520 based on the relative position of the symbol with respect to the italicized character. For example, the symbol may be centered above the italicized character or below the italicized character, or in some cases, the symbol may be positioned predominantly to the right or left side of the area above or below the italicized character 520. In some of these embodiments, the process uses the top edge or the bottom edge of the alignment shape 830 to perform the accent alignment operation. In other embodiments, the character 520 is associated with multiple symbols that are displayed above or below the character, or are displayed both above and below the character.

Figure 9:
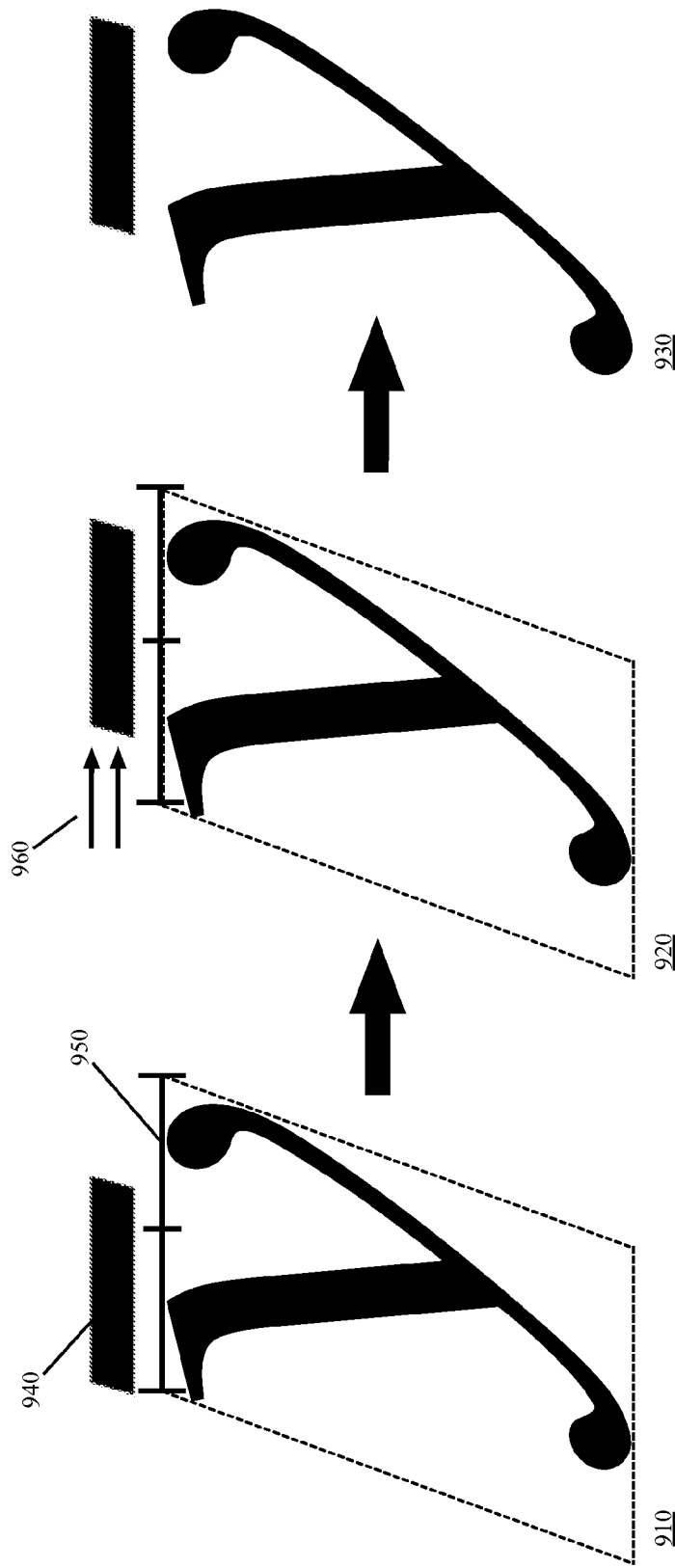
FIG. 9 illustrates an example of an accent mark aligned with the midpoint of the top of the character.

FIG. 9 illustrates, in three stages 910-930, an example of aligning a symbol with an associated character by using the defined alignment shape 830. The first stage 910 shows the alignment shape 830 surrounding the italicized character 520. Alignment guidelines 950 are shown in this stage 910 along the top edge of the alignment shape 830. Also shown in the first stage 910, just above the alignment guidelines, is the symbol 940 (i.e., a macron or overbar). As described above by reference to FIGS. 4 and 5, the process 400 receives the symbol 940 along with the associated italicized character. The symbol 940 shown in the first stage 910 is received by the content processing application and is ready to be aligned according to a placement location definition relative to the italicized character.

In the second stage 920, the symbol 940 is shown above the alignment guidelines 950 at a location defined relative to the italicized character. In this example, rightward-pointing arrows 960 conceptually illustrate a shift of the symbol 940 from a location that is misaligned with the italicized character. These rightward-pointing arrows 960 are only conceptual (i.e., are not displayed) and illustrate the shift of the symbol 940 from a position at which the symbol would be aligned with a non-italicized version of the character 520 (i.e., at the midpoint of a rectangle drawn to encompass the character). In some embodiments, the content processing application aligns the symbol 940 to the character by using the alignment guidelines 950 to identify an alignment position for the symbol. The alignment position, in some embodiments, specifies a horizontal position along the alignment guidelines 950 at which to place the symbol 940. For example, the alignment position may be a midpoint position of the alignment guidelines 940 at which to center the symbol 940 with the italicized character, or may be a quarter-point position at which to place the symbol 940 along the alignment guidelines 950, predominantly on either the left or right half of the top edge of the alignment shape 830.

The alignment guidelines 950, like the arrows 960, are conceptual for the purposes of illustration (i.e., are not displayed in the user interface along with the character and symbol). In some embodiments, the content processing application (e.g., a word processing application, a document publishing application, the equation editor for such an application, etc.) calculates the length of the top edge of the alignment shape and calculates the midpoint of the top edge in order to center the symbol above the character, then simply displays the character and its associated symbol in the correct place.

In the third stage 930, the symbol 940 is shown in proper alignment above the italicized character 520. Although many symbols are centered above or below an italicized character 520, the alignment shape described above allows the content processing application to effectively align symbols in other positions with respect to the character. As the alignment shape in some embodiments limits the range of positions for aligning symbols (e.g., accent or diacritical marks) in relation to an italicized character, the alignment operation is not limited to centering the alignments above an italicized character. In addition, the alignment operation can effectively align right-centric or left-centric symbols (e.g., accent and diacritical marks appearing predominantly on the left side or right side above or below the character) with respect to the italicized character. The content processing application, in some embodiments, aligns these non-centered symbols proportionally according to a set of calculations performed by the content processing application or by using the alignment guidelines 950 with the alignment shape. Thus, by limiting the range of positions from which to determine the placement position of symbol, the focus of placing the symbol in relation to the entire width of the italicized character is redirected to placing the symbol properly in relation to the relevant portion of the italicized character (e.g., the top point-to-point edge).

The examples described above relate to aligning symbols (e.g., textual accents or diacritical marks) above italicized characters using a typical slant orientation (e.g., forward-leaning, right-leaning) based on the italicized fonts that are applied to the character. In some embodiments, however, the italic slant of the italicized character is a left-leaning slant. Such left-leaning slant orientations are known as reverse italics. Reverse italic font styles that are applied to characters cause the italicized characters to lean left at the top of the characters. In some embodiments, the process 400, described above, is modified to process reverse italicized characters. In particular, the process 400 identifies the right-most projected point and the left-most overall path point. The process 400 projects several vectors to the top and bottom of the character, as describe above by reference to FIG. 7. Then, based on the identified alignment points, the process 400 constructs an alignment shape about the character displayed in the reverse italicized font, and aligns the symbol using the shape.

Also, in some embodiments, the symbol (e.g., accent or diacritical mark) to be aligned with the italicized character is defined for placement under the character (as opposed to above the character). The alignment operation for aligning subjacent symbols (e.g., accent marks or diacritical marks below the italicized character) is similar to the alignment operation for aligning symbols and other marks above the associated character.

Figure 10:
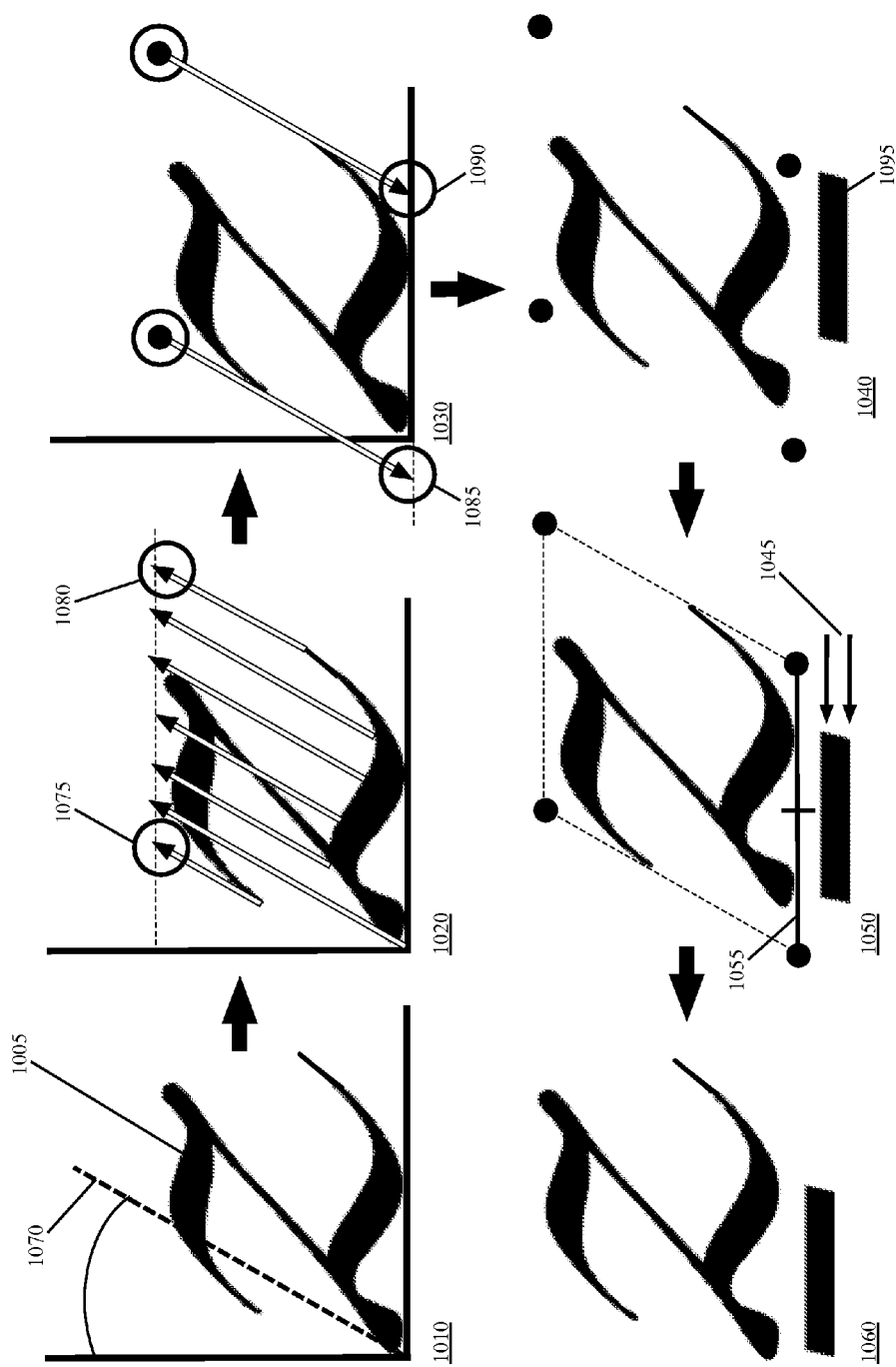
FIG. 10 illustrates an example of aligning an accent mark beneath a character in some embodiments.

FIG. 10 illustrates, in six stages 1010-1060, an example of aligning a symbol underneath an italicized character in some embodiments. In the first stage 1010, the angle 1070 of the italic slant for the italicized character 1005 (i.e., 'z') is determined. The content processing application determines the italic slant based on a font property that stores an angle associated with the italic slant. As shown in this example, the angle 1070 of the italic slant does not form a line between the two left-most points of the italicized character, but instead falls along only one of the left-most points, while projecting through a large portion of the italicized 'z' character 1005 at this stage.

In the second stage 1020, the upper left alignment point 1075 and the upper right alignment point 1080 are identified as the upper left and right corners of a shape to be formed around the italicized character 1005. The content processing application identifies the upper left and right alignment points in a manner similar to that described above by reference to FIGS. 6 and 7. As shown, the left-most projected point 1075 is not the left-most point of the character itself, but rather, is the projected point that is farthest to the left along the top of the character. On the other hand, the right-most point of the italicized 'z' character 1005 is the point at the far end of the tail along the bottom stroke of the 'z' character. Thus, the point at the top of the italicized 'z' character 1005 to which a vector is projected from the right-most point at the end of the tail is a substantial distance from any part of the top of the character (e.g., it appears to be a point positioned far from any actual points of the character 1005).

Next, in the third stage 1030, the lower left alignment point 1085 and the lower right alignment point 1090 are identified. The content processing application identifies the lower left and right alignment points in a manner similar to that described above. After the lower left alignment point 1085 and the lower right alignment point 1090 are identified, the application establishes the corners of the shape based on the identified alignment points, as shown in stage 1040. Also shown in the fourth stage 1040 is the symbol 1095 (e.g., a macron) to be positioned below the italicized character. As mentioned above, the symbol is received with the character in some embodiments. The symbol 1095 is not aligned with the italicized 'z' character 1005 until the shape is used to determine the position at which the symbol is in proper alignment with the character. As is conceptually illustrated in the fourth stage 1040, the midpoint of the entire point-to-point width of the italicized 'z' character 1005 would result in a misalignment of the symbol 1095.

The fifth stage 1050 illustrates the alignment shape as formed (i.e., as shown with dashed lines connecting the alignment points) by the content processing application. In addition, the alignment guidelines 1055 are shown at this stage 1050 along the bottom edge of the alignment shape. The alignment operation is conceptually illustrated by the leftward-pointing arrows 1045. The arrows 1045 indicate the symbol shift resulting from the alignment operation that is performed by the content processing application. This shift of the symbol results in the symbol 1095 being properly positioned under the italicized character 1005. As shown, the position to which the symbol 1095 has been shifted is a midpoint position under the bottom edge of the alignment shape.

Next, in the sixth stage 1060, the symbol 1095 is shown in proper alignment with the bottom of the italicized 'z' character 1005. In this example, the symbol is positioned below the character. Although in this example the content processing application has shifted the symbol to a midpoint beneath the italicized character, in other cases a subjacent symbol (e.g., accent or diacritical mark) may be shifted to other horizontal positions under the character.

In some embodiments, an override of the alignment operation occurs when the alignment operation would not result in a proper alignment of the symbol to the character. In some embodiments, the override is an operation based on an override property retrieved from an override property list (e.g., a limited list of certain characters that warrant special alignment procedures) for the character. Rather than using an alignment operation such as that shown in FIG. 4, the content processing application retrieves a symbol location from the override list and places the associated symbol according to this location. In these embodiments, the list of special characters is limited to certain characters in specific typefaces and font styles. Thus, the content processing application of some embodiments maintains a manageable list of special override characters that can be accessed during alignment processing. As the number of special characters is limited, the list of override characters could be stored with the content processing application and loaded into memory when the content processing application is operating.

In other embodiments, the override specifies a different alignment operation to be performed by the content processing application. For example, the content processing application may ignore a particular portion of the character when generating the shape and identifying the position at which to align the symbol. Some examples of characters that may warrant special override treatment include characters that have highly stylized flourishes or swashes, or long tail strokes which would result in a misalignment of the symbol above or below the character. In these cases, the content processing application could, for example, ignore the flourishes, swashes, and tails, and then perform the alignment operation. As shown in FIG. 10, the bottom stroke of the italicized 'z' character 1005 extends far to the right of the coordinate system of the character, well beyond other points at the top of the character. In this example, a symbol to be aligned above the italicized 'z' character 1005 would be misaligned as a result of the long tail of the bottom stroke. The content processing application could then process the special case character differently.

The examples described above by reference to FIGS. 4-10 relate to aligning various symbols, such as accent marks and diacritical marks, using an alignment shape. As the alignment shape is defined by the italic slant of an italicized character, the alignment shape effectively narrows the range of positions at which to place a textual symbol. Thus, content processing applications are not confined to the placement positions that are predefined in typefaces or font styles. Furthermore, content processing applications that use an alignment shape process, such as the process 400 of FIG. 4, are not required to maintain, for all characters in all typefaces and fonts, a list of positions at which to place accent marks. With thousands of typefaces defined for countless character sets, and numerous font styles defined for each character set typeface, maintaining a list of positions for textual symbols (such as accents and diacritical marks) is unmanageable. Furthermore, such a list would require substantial resources (e.g., permanent disk space, runtime memory, cache space, etc.) to maintain. On the other hand, maintaining such a list only for specific characters that require an override (e.g., the "z" shown in FIG. 10, or certain symbols with long stems, such as an italicized "j") does not require an excessive amount of resources (e.g., memory).

In addition, the examples described above relate to the alignment of a single symbol (such as an accent mark) either above or below an italicized character. The alignment position, in some of these embodiments, is based on a single horizontal position at which to align the symbol either above or below the italicized character. In other embodiments, multiple symbols are defined for placement above or below the character. In these embodiments, the process positions a first symbol using an alignment shape as described above. The process then uses the alignment shape to align another symbol with the same italicized character. In some cases, a conflict may arise in which the shape-aligned position of a first symbol overlaps with the shape-aligned position of a second symbol. For example, a positioning conflict may arise for an italicized character 'u' having both an overbar and a cedilla. In these cases, the process of some embodiments overrides the alignment operation. For example, as in the case of special characters mentioned above, the processing of conflicts between the symbols may be based on a property that indicates a symbol conflict for the associated character. Different embodiments handle such conflicts differently. For example, the content processing application could access a list of conflict rules for processing the conflict. In other cases, other remedial operations may be used to align the conflicting symbols (i.e., placing one further from the character than the other).

Furthermore, in the examples above, the character is described as having an italic slant according to a true italics or oblique font style. However, other highly stylized fonts (e.g., Zapfino) are in some cases applied to symbols and associated characters. In some of these cases, characters having highly accentuated serifs, tails, stems, and other flourishes are included in an override property list such as that mentioned above. In some instances, the override property specifies one or more of several override operations to perform, including: (1) estimating a proper alignment position, the accuracy of which can be later validated by further processing or user observation; (2) aligning the symbol to the character based on a subset of points along a subpath of the character; and (3) aligning the symbol to the character based on a default position defined for special characters.

II. Document Authoring Application

Figure 11:
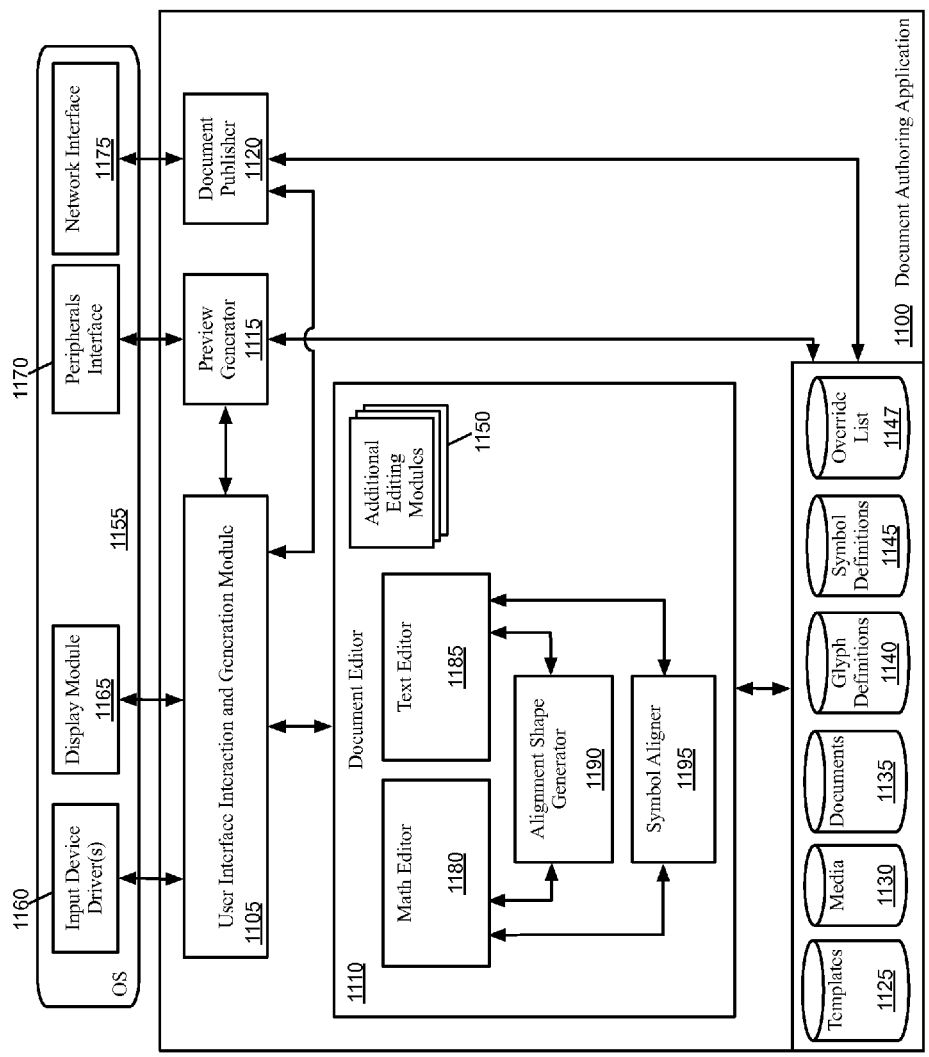
FIG. 11 illustrates a software architecture block diagram of a document authoring application of some embodiments.

In some embodiments, the processes described above are implemented as software running on a particular machine, such as a computer or a handheld device, or stored in a machine-readable medium. FIG. 11 conceptually illustrates the software architecture of a document authoring application 1100 of some embodiments. In some embodiments, the document authoring application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The document authoring application 1100 includes a user interface (UI) interaction and generation module 1105, a document editor 1110, a preview generator 1115, and a document publisher 1120. The figure also illustrates stored data associated with the document authoring application, including templates 1125, media 1130, documents 1135, glyph definitions 1140, symbol definitions 1145, and override list 1147.

In some embodiments, the templates data 1125 stores template files that define different types of documents a user can create with the document authoring application 1100. The media data 1130 stores various types of media files (e.g., still image files, video files, audio files, combined video and audio files, etc.) imported into the application. The documents data 1135 of some embodiments stores user-created documents, that may incorporate or refer to media 1130 and templates 1125. In some embodiments, the documents 1135 are stored by the document authoring application as hierarchical structures (e.g., organized into chapters, sections, etc.).

The glyph definitions 1140 stores graphical information about the glyphs (characters, numbers, symbols, etc.) used by the document authoring application to generate text, math equations, etc. The graphical information includes path information for each glyph (e.g., the connected points and curves of each glyph). This path information is stored as vector data in some embodiments. The symbol definitions 1145 of some embodiments stores information about the symbols (e.g., accents, diacritical marks, mathematical notation symbols, pronunciation marks, etc.) used in connection with various characters. This information may include placement of a symbol relative to an associated character (e.g., above or below the character, horizontal location, etc.). The override list 1147 stores a limited list of characters for which associated symbols warrant special alignment procedures, because the alignment process of some embodiments will result in a misaligned symbol. In some embodiments, the override list 1140 maintains position information for aligning symbols relative to the characters in the override list. In other embodiments, the override list 1147 includes different alignment operations for aligning symbols relative to the characters in the override list.

In some embodiments, the sets of data 1125-1147 are stored in one physical storage (e.g., an internal hard drive, external hard drive, etc.). In some embodiments, the data may be split between multiple physical storages. For instance, the template files 1125 and media files 1130 might be stored in one physical storage, while the user-created documents are stored in a separate physical storage. In addition, some of all of the data 1125-1147 may be stored across multiple physical storages in some embodiments (e.g., storing the media or documents in several different storages).

FIG. 11 also illustrates an operating system 1155 that includes input device driver(s) 1160, display module 1165, peripherals interface 1170, and network interface 1175. In some embodiments, as illustrated, the device drivers 1160, display module 1165, peripherals interface 1170, and network interface 1175 are part of the operating system 1155 even when the document authoring application 1100 is an application separate from the operating system.

The input device drivers 1160 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 1105.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 1165 translates the output of a user interface for a display device. That is, the display module 1165 receives signals (e.g., from the UI interaction and generation module 1105) describing what should be displayed and translates these signals into pixel information that is sent to the display device. The display device may be an LCD, plasma screen, CRT monitor, touchscreen, etc.

The peripherals interface 1170, in some embodiments, allows for a peripheral device to connect (either via a wired (e.g., USB, Firewire) connection or a wireless (e.g., Bluetooth, WiFi) connection) to the machine on which the operating system 1155 and document authoring application 1100 run. Examples of such peripheral devices may include smart phones (e.g., an iPhone), specialized electronic book readers, or more generic tablets (e.g., an iPad) that include electronic book reader functionality.

The network interface 1175 represents one or more connections to various types of networks, through which the document authoring application 1100 may upload published documents (e.g., to a content distribution system). These network connections may include WiFi or other wireless connections, Ethernet or other wired connections, etc.

The UI interaction and generation module 1105 of the document authoring application 1100 interprets the user input data received from the input device drivers and passes it to various modules, including the document editor 1110 and its various component modules, the preview generator 1115, and the document publisher 1120. The UI interaction module also manages the display of the document authoring application GUI, and outputs this display information to the display module 1165. This UI display information may be based on information from the document editor 1110, the document publisher 1120, etc. In addition, the module 1105 may generate portions of the UI based solely on user input—e.g., when a user moves an item in the UI that only affects the display rather than any of the other modules, such as moving a window from one side of the UI to the other. In some embodiments, the UI interaction and generation module 1105 generates a basic GUI and populates the GUI with information from the other modules and stored data (e.g., the document data 1135).

The document editor 1110 includes a math editor 1180, a text editor 1185, an alignment shape generator 1190, and a symbol aligner 1195, as well as additional editing modules 1150. The document editor 1110 enables a user to create documents (e.g., word processing documents, electronic books, etc.) with a variety of text, equations, media (e.g., audio, video), electronic book constructs (e.g., graphs, sidebars, popovers, etc.), and other features.

The math editor 1180 allows the user to express equations in mathematical notation using a variety of symbols (operators, set notation symbols, relationship symbols, etc.), numbers, characters, and other mathematical elements. In some embodiments, the math editor 1180 includes an equation kit that evaluates the mathematical notation symbols entered by the user and generates a properly formatted equation. In some such embodiments, the math editor 1180 receives user-entered mathematical notation as a continuous stream (e.g., while the user is entering the symbols) of mathematical symbols, characters, and numbers. The math editor 1180 in such cases directs the equation kit to process each mathematical element in the stream approximately simultaneously (e.g., on-the-fly) with the input by the user. In other such embodiments, the math editor 1180 receives the mathematical notation input as a formula that includes several previously-entered mathematical symbols, characters, and numbers. For instance, the math editor 1180 receives such a formula with several mathematical elements when the user chooses to publish a document containing the formula. In this case, the math editor 1180 processes the formula piecemeal in an organized manner (e.g., sequentially, by an order of operations in the formula, by traversing a tree structure defined for the equation, etc.).

The text editor 1185 allows the user to enter character-based textual data (i.e., alpha-numeric characters, accents, diacritical marks, and other character-based symbols) in a document. In some embodiments, the text editor 1185 receives textual information that a user enters, including symbols or other marks that are associated with characters (e.g., ñ, ö, ū, etc.). In some such embodiments, the text editor 1185 receives the textual information as a continuous stream of character data (e.g., while the user is entering the textual information). The text editor 1185 in this case processes each character in the stream approximately simultaneously (e.g., on-the-fly) with the input by the user. In other such embodiments, the text editor 1185 receives the textual information as a string of characters and associated symbols (e.g., when the user chooses to publish a document containing previously-entered text). In this case, the text editor 1185 processes the string of characters and symbols in an organized manner (e.g., sequentially).

The alignment shape generator 1190 of some embodiments generates an alignment shape for aligning symbols to graphical elements (e.g., characters, numbers, mathematical notation symbols, etc.). The alignment shape generator 1190 receives symbols to align with mathematical base elements from the math editor 1180 or symbols and associated base characters from the text editor 1185. The alignment shape generator uses the received mathematical base element or base character to generate a shape from which a proper alignment position for the symbol can be determined. In some embodiments, the alignment shape generator 1190 retrieves a path of points that outline each glyph of the character or mathematical symbol from the glyph definitions 1140. After generating the alignment shape, the alignment shape generator 1190 sends the shape to the math editor 1180 or text editor 1185, depending on which module requests the alignment information.

The symbol aligner 1195 performs an alignment operation that properly aligns a symbol with an associated base character (or base element) in some embodiments. To properly align such symbols, the symbol aligner 1195 receives an alignment shape (i.e., generated by the alignment shape generator 1190), a base character, and a symbol to align with the base character from the math editor 1180 or text editor 1185. The symbol aligner then uses the alignment shape to align the symbol with the base character (or base element). In some embodiments, the symbol aligner 1195 retrieves a position definition that indicates a location (e.g., midpoint, quarter-point, etc.) for aligning the symbol. After aligning the symbol with the base character or element, the symbol aligner 1195 sends the aligned symbol and base character or element back to the corresponding editor.

In some embodiments, the symbol aligner 1195 does not receive an alignment shape (e.g., when the math editor or text editor processes a character with an alignment override). In these cases, the symbol aligner 1195 may retrieve from the override list 1140 a property for aligning the symbol with the override character, and then align the symbol with the character according to the property.

The additional editing modules 1150 enable various additional editing features. These features include formatting of electronic documents, addition of media and other constructs (e.g., graphs, sidebars, popovers, etc.) to electronic documents, spellchecking and other review features, etc.

The preview generator 1115 of some embodiments generates a preview of an electronic document (e.g., an electronic book) in order to allow a user to see how a document currently being edited will look in its final form. In some embodiments, the preview generator 1115 generates the preview of the document and sends this preview through the peripheral interface 1170 to an external electronic document reader device (e.g., a smart phone, a tablet computer, a specialized e-book reader, etc.). In addition, in some embodiments the document authoring application 1100 allows the user to preview the document through the application's user interface. The preview generator of some such embodiments can send the preview to the UI interaction and generation module 1105 for display in the authoring application user interface.

The document publisher 1120 of some embodiments generates a final version of an electronic document (e.g., an e-book in either a standardized or proprietary format) for sending out (e.g., via the network interface 1175) to a content distribution system. In some embodiments, the document publisher 1120 creates the electronic document and/or a sample version of the electronic document, and a separate application connects to the content distribution system in order to upload (publish) the document.

While many of the features of document authoring application 1100 have been described as being performed by one module (e.g., the UI interaction and generation module 1105, the document publisher 1120, etc.), one of ordinary skill in the art will recognize that the functions described herein might be split up into multiple modules. Similarly, functions described as being performed by multiple different modules might be performed by a single module in some embodiments (e.g., the preview generator 1115 might actually be part of the document publisher 1120, the alignment shape generator 1190 and symbol aligner 1195 might be part of a single larger module, etc.).

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
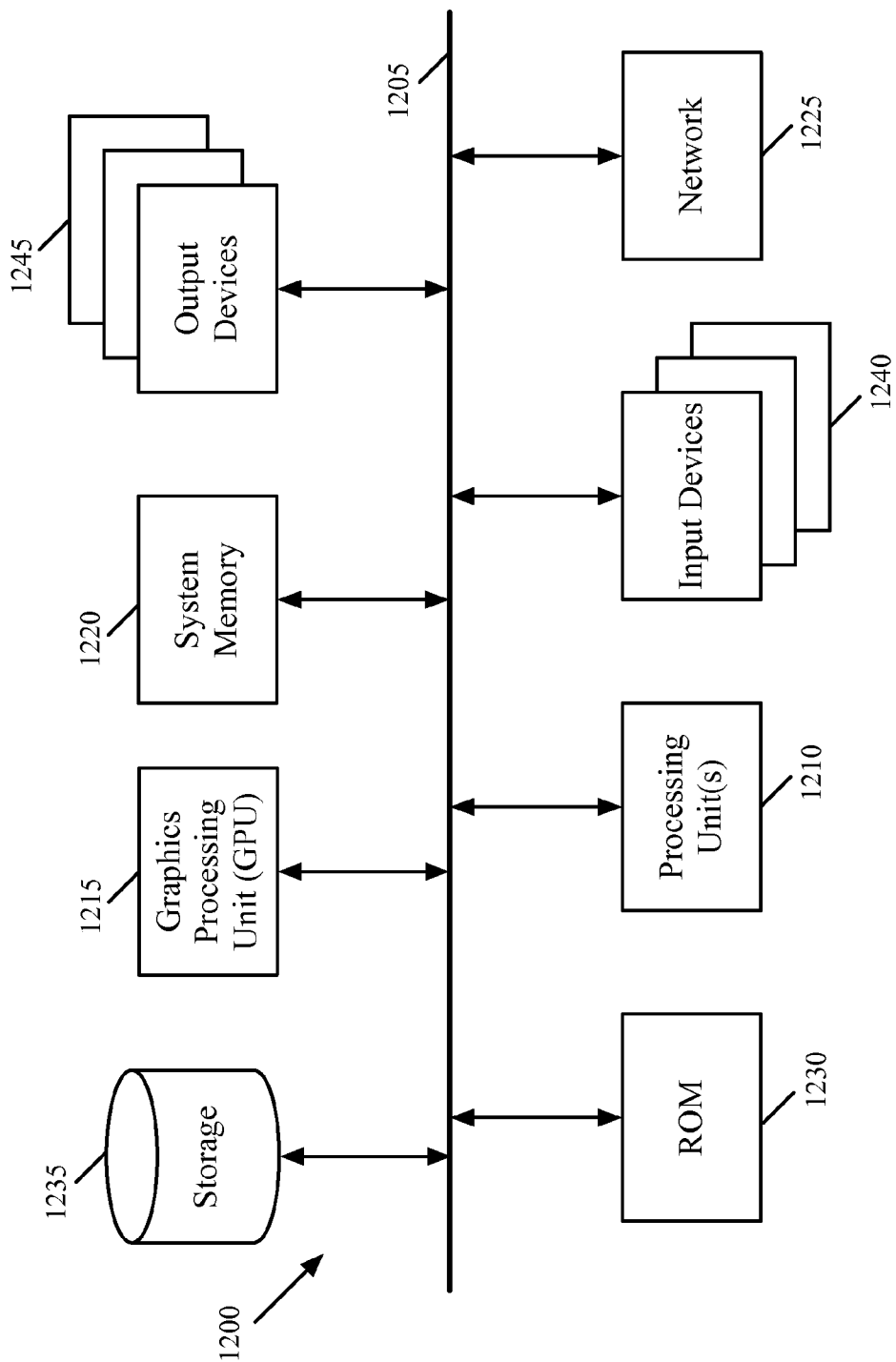
FIG. 12 conceptually illustrates an example of an electronic system with which some embodiments are implemented.

FIG. 12 conceptually illustrates an example of an electronic system 1200 with which some embodiments are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210. In some embodiments, such functionality can be provided using CoreImage's kernel shading language.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an intranet), or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 2 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A non-transitory machine readable medium storing a program which when executed by at least one processing unit aligns a symbol with an associated character, the program comprising sets of instructions for:
   projecting a set of lines from a first plurality of points on the character along a slope of the character;
   identifying a second plurality of points on the projected lines along a top of the character;
   generating an alignment shape surrounding the character based on the identified second plurality of points, the alignment shape comprising a plurality of sides; and
   aligning the associated symbol with the character along one of the plurality of sides of the alignment shape.

2. The non-transitory machine readable medium of claim 1, wherein the character comprises an angled typeface.

3. The non-transitory machine readable medium of claim 2, wherein the angled typeface is one of an italics typeface and an oblique typeface.

4. The non-transitory machine readable medium of claim 2, wherein the angled typeface defines a character slant orientation.

5. The non-transitory machine readable medium of claim 1, wherein the generated alignment shape is a shape substantially surrounding the character.

6. The non-transitory machine readable medium of claim 1, wherein the set of instructions for generating the alignment shape comprises sets of instructions for:
   identifying a third plurality of points on the projected lines along a bottom of the character; and
   connecting at least one point in the second plurality of points and one point in the third plurality of points in generating the alignment shape.

7. A non-transitory machine readable medium storing a program which when executed by at least one processing unit aligns a symbol with an associated character, the program comprising sets of instructions for:
   identifying an italic slant of a character;
   projecting a set of lines from a first plurality of points on the character along the italic slant of the character;
   identifying a second plurality of points on the projected lines along a top of the character;
   generating an alignment shape surrounding the character based on the identified second plurality of points, the alignment shape comprising a plurality of sides; and
   aligning the symbol associated with the character along one of the plurality of sides of the alignment shape.

8. The non-transitory machine readable medium of claim 7, wherein the set of instructions for identifying the italic slant of the character comprises a set of instructions for calculating an angle at which the character is oriented.

9. The non-transitory machine readable medium of claim 8, wherein the set of instructions for calculating the angle comprises a set of instructions for determining a slope between at least two points of the character.

10. The non-transitory machine readable medium of claim 9, wherein the set of instructions for determining the slope comprises sets of instructions for:
    identifying a position, in a coordinate system associated with the character, of a first point of the character;
    identifying a position, in the coordinate system, of a second point of the character; and
    computing the slope based on the positions of the first and second points.

11. The non-transitory machine readable medium of claim 7, wherein the set of instructions for generating the alignment shape comprises a set of instructions for using the italic slant in a coordinate system of the character to identify the second plurality of points.

12. The non-transitory machine readable medium of claim 11, wherein the second plurality of points comprises a first point at a top of the character that is determined by projecting a first vector along the italic slant from a left most point of the character to the top of the character, wherein the second plurality of points comprises a second point at the top of the character that is determined by projecting a second vector along the italic slant from a right-most point of the character to the top of the character.

13. The non-transitory machine readable medium of claim 12, wherein the set of instructions for generating the alignment shape further comprises a set of instructions for connecting the first and second points in the second plurality of points to form the alignment shape around the character.

14. The non-transitory machine readable medium of claim 7, wherein the alignment shape specifies a position within a portion of the generated shape at which to align an accent mark.

15. The non-transitory machine readable medium of claim 14, wherein the position is a midpoint of the portion at which to align the accent mark.

16. The non-transitory machine readable medium of claim 7, wherein the program further comprises a set of instructions for identifying an override property associated with the character, wherein the set of instructions for generating the alignment shape comprises sets of instructions for:
identifying a position at which to align the symbol based on the override property; and
setting the identified position as a property of the generated alignment shape.

17. A non-transitory machine readable medium storing a content processing application, the content processing application comprising:
an alignment shape generator for:
projecting a set of lines from a first plurality of points on a character along a slope of the character;
identifying a second plurality of points on the projected lines along a top of the character;
generating an alignment shape surrounding the character based on the identified second plurality of points, the alignment shape comprising a plurality of sides; and
a symbol aligner for aligning an associated symbol with the character along one of the plurality of sides of the alignment shape.

18. The non-transitory machine readable medium of claim 17, wherein the alignment shape generator is further for identifying an italic slant of the character, said italic slant used to generate the alignment shape.

19. The non-transitory machine readable medium of claim 17, wherein the symbol aligner is further for retrieving a position definition for aligning the symbol with the character, wherein the symbol aligner aligns the symbol with the character by placing the symbol at a position of the alignment shape based on the position definition.

20. The non-transitory machine readable medium of claim 17, wherein the content processing application further comprises a content editor comprising a text editor for receiving user-entered text data and a math editor for receiving user-entered equation data the text data and the equation data for generating said character and the associated symbol.

\* \* \* \* \*